United States Patent [19]

Liu et al.

[11] Patent Number: 4,532,282

[45] Date of Patent: Jul. 30, 1985

[54] BLENDS OF AROMATIC POLYCARBONATE RESIN, OLEFIN POLYMERS OR COPOLYMERS AND ACRYLATE- OR METHACRYLATE-COPOLYMER RESINS

[75] Inventors: Ping Y. Liu, Naperville, Ill.; David E. Overton, Mt. Vernon, Ind.

[73] Assignee: General Electric Company, Mt. Vernon, Ind.

[21] Appl. No.: 475,746

[22] Filed: Mar. 16, 1983

[51] Int. Cl.$^3$ .................. C08K 5/42; C08L 69/00
[52] U.S. Cl. ...................... 524/157; 524/522; 524/523; 524/537; 525/67; 525/146; 525/148
[58] Field of Search ............ 525/67, 146, 148; 524/537, 157, 522, 523

[56] References Cited

U.S. PATENT DOCUMENTS

| | | | |
|---|---|---|---|
| 3,431,224 | 3/1969 | Goldblum | 525/148 |
| 4,226,950 | 10/1980 | Hobub et al. | 525/146 |
| 4,257,937 | 3/1981 | Cohen et al. | 525/148 |
| 4,363,201 | 4/1981 | Mark et al. | 525/146 |

FOREIGN PATENT DOCUMENTS 57-153041  9/1982  Japan .
57-153042  9/1982  Japan .

*Primary Examiner*—Jacob Ziegler
*Attorney, Agent, or Firm*—Martin B. Barancik

[57] ABSTRACT

Thermoplastic molding compositions are described which comprise an admixture of (a) an aromatic polycarbonate resin, (b) an olefinic polymer or copolymer and (c) a third component which is a copolymer of an olefin and an acrylate, methacrylate, acrylic acid or methacrylic acid. The presence of the third component enhances impact strength in thicker sections and improves weld line strength.

16 Claims, No Drawings

BLENDS OF AROMATIC POLYCARBONATE RESIN, OLEFIN POLYMERS OR COPOLYMERS AND ACRYLATE- OR METHACRYLATE-COPOLYMER RESINS

BACKGROUND OF THE INVENTION

The aromatic carbonate polymers, also referred to as aromatic polycarbonate resins, are a well known family of available materials which enjoy a variety of applications. These polymers are characterized by good ductility in thinner sections, manifesting high impact strength in articles molded or otherwise shaped from the polymer or blends of the polymer. However, in certain applications where thicker sections are desired, the use of aromatic polycarbonates is limited because the ductility and the impact strength tends to decline with increasing average thickness.

It has been proposed that the resistance of aromatic polycarbonates to environmental stress crazing and cracking can be improved by admixing the polymer with polyolefins and olefin copolymers. Blends of that kind are disclosed by Goldblum in U.S. Pat. No. 3,431,224. In practice, however, it has been found that the use of polyolefins in blends with aromatic polycarbonates is somewhat limited. More specifically, when the polyolefins are incorporated in levels which are high enough to achieve the desired advantage of improved stress cracking/crazing resistance, there is a tendency for the molded part to delaminate in processing.

SUMMARY OF THE INVENTION

The discovery has now been made that certain acrylic-olefin copolymers (c) are effective in minor amounts to significantly enhance the impact strength in thicker sections of compositions comprising an aromatic polycarbonate resin (a) and an olefin polymer or copolymer or mixture thereof (b), while at the same time retaining a desirable ductile failure mode on impact. In addition, the compositions appear to have enhanced compatibility over blends of (a) and (b) alone because weld line strength is improved after molding in double gate molds. More specifically, such acrylic olefin copolymers can be the polymerization product of an olefin and an acrylic monomer selected from an acrylate, a methacrylate, acrylic acid, methacrylic acid or a mixture thereof. These are described in greater detail below.

The presence of the described acrylic polymers, e.g., a co- or terpolymer of one or more of a $C_{2-5}$ olefin (having from 2 to 5 carbon atoms) and a $C_{1-8}$ acrylate or methacrylate (the ester alcohol group having from 1 to 8 carbon atoms), even in relatively small amounts, e.g., less than 5 parts by weight, per 100 parts by weight of the total composition, permits the use of olefin polymers in widely ranging proportions. For example, compositions containing from 55 to 93 parts by weight of (a), from 3.5 to 30 parts by weight of (b) and from 3.5 to 15 parts by weight of (c), per 100 parts of (a),(b) and (c), combined, are typical of the invention, in contrast to prior art blends where only small amounts of polyolefin are tolerable without a concomitant tendency to become embrittled upon heat aging.

The amount of polyolefin or olefin copolymer (b) and acrylic-olefin copolymer (c) to be used in combination with the polycarbonate varies widely, but the minimum amount is any quantity which significantly enhances the impact strength of the polycarbonate (a) in thick molded sections, e.g., of the order of ¼ inch. Clearly, this minimum amount will vary somewhat depending upon the specific olefin polymer or copolymer, the acrylate-olefin copolymer and the aromatic carbonate polymer employed. However, in general, a minimum amount of about 3.5 weight percent of olefin polymer or copolymer must be present, based on (a), (b) and (c), and a minimum of about 3.5 weight percent of (c), based on (a), (b) and (c), should be used. The upper limit of components (b) and (c) should be the respective amounts which will allow the aromatic carbonate polymer to retain a significant number of its desirable properties. Generally, not more than about 45 weight percent of the composition (b) and (c) will be present, based on (a), (b) and (c).

DESCRIPTION OF THE INVENTION

In general, the aromatic polycarbonate resin, component (a), useful in the practice of this invention may be selected from among those having the formula

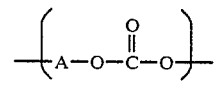

wherein A is a divalent aromatic radical of the dihydric phenol employed in the polymer producing reaction.

In preferred embodiments, the polycarbonate is more typically a resin of the formula

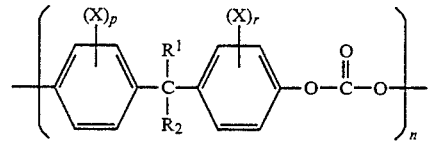

wherein $R_1$ and $R^2$ are, independently, hydrogen, (lower) alkyl or phenyl; X is, independently, (lower) alkyl, chloro, bromo or hydrogen; p and r are, independently, from 0 to 4; and n represents the total number of monomer units and is an integer at least about 30. The term "(lower) alkyl" is intended to mean a straight or branched alkyl group having from 1 to about 10, and more frequently, from 1 to about 6 carbon atoms, for example, methyl, ethyl, propyl, butyl, pentyl, hexyl, octyl, nonyl, decyl, isopropyl, isobutyl, trimethyl ethylmethyl, and so forth.

Special mention is made of polycarbonate resins devoid of substituents on the aromatic rings in the polymer chain, i.e., where p and r are zero in the above formula, although this feature is not essential to the successful practice of the invention.

By way of illustration, the terminology "aromatic polycarbonate resin" as employed in this disclosure is meant to include homopolymeric carbonates and copolymeric carbonates, as well as mixtures the two, in which the polymer or copolymer has a molecular weight (number average) of from about 8,000 to about 200,000 or higher, but preferably from about 10,000 to about 80,000. The preferred polymers will usually be characterized by an intrinsic, i.e., inherent, viscosity within the range from about 0.30 to about 1.0 deciliters per gram (dl/g) as measured in solution in methylene chloride at 25° C. To illustrate further, such polycarbonates may be derived from dihydric phenols such as 2,2-bis(4-hydroxyphenyl) propane; bis(4-hydroxyphenyl) methane; 2,2-bis(4-hydroxy-3-methylphenyl) propane; 4,4-bis(4-hydroxyphenyl) heptane; 2,2-(3,5,3',5'-tetrachloro-4,4'-dihydroxydiphenyl) propane; 2,2-(3,5,3',5'-tetrabromo-4,4'-dihydroxydiphenyl) propane; and bis(3,3'-dichloro-4,4'-dihydroxydiphenyl) methane. Other suitable dihydric phenols are disclosed in U.S. Pat. Nos. 2,999,835; 3,028,365; 3,334,154; and 4,131,575.

The above mentioned aromatic polycarbonates can be prepared by use of known processes, such as, for instance, by reacting a dihydric phenol with a carbonate precursor, e.g., phosgene, in accordance with procedures set forth in the patent literature cited above and in U.S. Pat. Nos. 4,018,750 and 4,123,436; or by transesterification processes such as those which are disclosed in U.S. Pat. No. 3,153,008; as well as other processes known to those skilled in the art.

In addition, the aromatic polycarbonates utilized in the present invention can include polymeric derivatives of a dihydric phenol, a dicarboxylic acid and carbonic acid. A suitable procedure is described in U.S. Pat. No. 3,169,121. Branched polycarbonates, such as disclosed in U.S. Patent No. 4,001,184; or mixtures of branched and linear polycarbonates may also be employed in the compositions.

Also encompassed within the scope of this invention are polycarbonates which have been prepared from two or more different dihydric phenols, or from a copolymer of a dihydric phenol with a glycol or acid terminated polyester, or with a dibasic acid in the event that a carbonate interpolymer or copolymer is desired.

It can thus be seen that a wide variety of aromatic polycarbonates are useful in the present kinds of compositions.

Component (b), which may be an olefin homopolymer or copolymer, is selected from among the materials well known in the art as comprising this class. Preferred for use in this invention are polymers which have been derived from olefins containing from 2 to 10 carbon atoms. Special mention is made of polyethylene, polypropylene, polyisobutylene, ethylene-propylene copolymers and ethylenepropylene diene terpolymers (e.g., EPDM rubbers) in their various forms, and linear low density polyethylenes, e.g., copolymers of ethylene and butene-1, since these are the most readily available commercially.

Methods for the preparation of these polymers, both commercial and non-commercial, are abundantly described in the literature and known to those skilled in the art. The polyethylenes can be prepared by various procedures, using anionic, cationic or free-radical initiating catalysts, with conditions varied to produce a range of molecular weights and densities and various degrees of branching or nonbranching for the polymer. In one procedure, which involves free radical initiation, ethylene gas is polymerized in the presence of a peroxide initiating catalyst at a pressure between 15,000 and 40,000 psi and a temperature between 100° and 200° C., to produce a relatively low density polymer, 0.90 to 0.94 g/cm$^3$.

The polyethylene can also be prepared by low pressure processes effective to attain a polymer of higher molecular weight and higher density. In one such procedure, known as the Phillips process, ethylene is contacted in an insert solvent with a slurry of a catalyst such as chromium oxide supported on silica-alumina, at pressures of 400 to 500 psig and temperatures of 130° to 170° C., followed by extraction of the polymer with hot solvent and purification, to produce a polyethylene product having a density between 0.96 to 0.97 g/cm$^3$.

Still other procedures are possible, such as emulsion polymerization in aqueous media in the presence of a peroxy compound, as well as suspension polymerization at low temperatures using a silver salt-peroxide redox system.

Any of the foregoing processes are utilizable to obtain polymers of ethylene suitable for use in the present compositions.

Also employable as component (b) is polypropylene, a common commercial form of which is crystalline isotactic polypropylene. Such polymers can be prepared by anionically initiated reactions using Ziegler type catalysts, e.g., titanium halide such as TiCl$_3$ in combination with an organometallic co-catalyst such as trialkyl aluminum halide. Polymerization generally proceeds rapidly at temperatures between 25° and 100° C. to yield a polymer in the form of a slurry of insoluble granular powder.

Copolymers of ethylene and propylene, and terpolymers thereof with dienes, can be prepared using procedures similar to those for polyethylene and other polyolefins; for instance, by the polymerization reaction of a mixture of ethylene and propylene, and optionally, e.g., butadiene, in the presence of a Ziegler type catalyst (e.g., transition metal compound and organometallic compound), or by free radical initiation under high pressures.

Polymers based on still higher olefins are not as readily available and, therefore, not as preferred. Examples of such higher polyolefins are polymers based on 3-methyl-1-butene($H_2C=CHCH(CH_3)_2$). 1-pentene($H_2C=CHCH_2CH_2CH_3$); and 4-methyl-1-pentene ($H_2C=CHCH_2CH_2—(CH_3)_2$). They can be prepared by known procedures including those described in The Encyclopedia of Polymer Science and Technology, John Wiley & Sons, Inc., Volume 9, pages 440–460 (1965).

As indicated above, component (c) is a copolymer or terpolymer of an olefin or olefins and an acrylate, methacrylate, acrylic and/or methacrylic acid. Preferably, the acrylate or methacrylate is derived from a $C_{1-6}$ alcohol, providing, for example, methyl acrylate, ethyl acrylate, propyl acrylate, butyl acrylate, methyl methacrylate, ethyl methacrylate, butyl methacrylate, etc. These co- and terpolymeric materials are available and methods for their preparation are known.

Special mention is made of copolymers of ethylene and ethyl acrylate, examples of which are available from Union Carbide Corporation under the trade designations Bakelite DPD 6169 and Bakelite DPD 6182; and also terpolymers of ethylene, propylene and acrylic acid, examples of which are available able from Reichhold Chemical Company under the trade designated Polybond series, e.g., Polybond 1016, 1016A and 1016H.

Component (c) need be present only in minor amounts to effect the described improvement in thick section impact strength. In general, amounts of between about 1 and about 15 parts by weight for every 100 parts of (a), (b) and (c) combined will suffice to confer the described beneficial effect.

In addition to the essential ingredients which have just been described, the compositions may and often do contain one or more additives conventionally employed in polycarbonate resins and resin blends. These additives are selected generally from among fillers and/or reinforcing agents, flame retardant and/or drip retardant agents, thermal or UV stabilizers, antioxidants, dyes, pigments, and so forth.

Examples of fillers and/or reinforcements include clays, wollastonite, titanium dioxide, mica, talc, titanate whiskers, calcium silicate, calcium sulfate, filamentous carbon, and glass flakes or fibers. These materials, when present, are usually included in amounts of from about 1 to about 60 parts by weight of the total composition. The other additives, such as flame retardant agents, especially metal salts of organic sulfonic acids, drip retardant agents, stabilizers, antioxidants, etc., will normally be included in amounts of from about 1 to about 25% by weight of the composition.

The compositions may be prepared by a procedure in which the ingredients are dry (tumble) blended, passed through a single or a twin screw extruder at a temperature of from about 250° to about 270° C., collected, chopped into molding pellets and injection molded at a temperature of from about 250° to about 270° C. Alternatively, the ingredients can be solution or melt blended instead of dry blended during the initial stage of preparation, which may avoid the need for compounding the blend in an extruder prior to molding. In either case, a molded article results which possesses mechanical properties characteristic of polycarbonate resins and blends generally and has the additional advantage of good impact strength in thicker sections together with greater resistance toward embrittlement on exposure to gasoline.

The resistance to environmental stress crazing and cracking of the polycarbonate resin mixtures prepared in accordance with the invention was determined by subjecting stressed specimens to gasoline soaking and then measuring their impact strengths with special attention to their mode of failure, ductile failure being preferable. The specimens are ASTM D-256 impact test bars of two sizes: $2\frac{1}{2}'' \times 178'' \times 150''$ and $2\frac{1}{2}'' \times \frac{1}{2}'' \times \frac{1}{4}''$. Values of the desired stress were applied to each test bar by mounting on an ASTM stress jig (0.4 percent strain). The mounted bars were soaked 4 hours at room temperature in AMOCO ® unleaded premium gasoline. They were removed from the jig, the gasoline evaporated and the bars dried for 24 hours. Izod impact strengths were then determined according to ASTM D-256 procedures on notched specimens. In most cases, the properties are compared with those of identical unsoaked, molded mixtures. Those which retain a substantial amount of impact resistance after soaking are obviously the best at resisting environmental stress cracking.

DESCRIPTION OF THE SPECIFIC EMBODIMENTS

The following examples illustrate the invention. These are included for illustrative purposes only, to show preferred or best embodiments, and they are not intended as a limitation on the scope of the invention.

EXAMPLES 1–6

The following compositions were prepared by tumble blending the ingredients, extruding the blend at a temperature of 270° C., and injection molding the extrudate into test bars at 270° C. injection temperature (66° C. mold temp.). The results are shown in the Table.

TABLE 1

| Example | COMPOSITIONS AND PROPERTIES | | | | | | | |
|---|---|---|---|---|---|---|---|---|
| | PC* | 1A* | 1 | 2 | 3 | 4 | 5 | 6 |
| Components, parts by weight | | | | | | | | |
| Poly(bisphenol A carbonate resin (LEXAN ®, General Electric Co.) | 100 | 90 | 90 | 86 | 86 | 86 | 67 | 67 |
| Polypropylene/EPDM rubber (70:30 ratio) | — | — | — | — | — | — | — | 29 |
| Polypropylene (Shell Chemical 7328) | — | — | — | — | — | — | 29 | — |
| (Exxon PP1012) | — | 10 | — | — | — | — | — | — |
| Ethylene propylene copolymer (Profax 8623, Hercules Chemicals) | — | — | — | 10 | 10 | 10 | — | — |
| Ethylene/butene-1 copolymer (Exxon - LPX-15) | — | — | 3 | — | — | — | — | — |
| Ethylene/ethyl acrylate copolymer (Bakelite DPD 6169, Union Carbide Co.) | — | — | 7 | — | — | — | — | 4 |
| Ethylene/ethyl acrylate copolymer (Bakelite DPD 6182) | — | — | — | — | — | — | 4 | — |
| Ethylene/propylene acrylic acid terpolymer (Reichhold's Polybond 1016; E/P/AA-19/75/6) | — | — | — | — | — | 4 | — | — |
| Ethylene/propylene/acrylic acid terpolymer (Reichhold's Polybond 1016A; E/P/AA-80/14/6) | — | — | — | — | 4 | — | — | — |
| Ethylene/propylene/acrylic acid terpolymer (Reichhold's Polybond 1016H; E/P/AA-15/79/6) | — | — | — | 4 | — | — | — | — |
| Properties | | | | | | | | |
| Before Gasoline Soaking | | | | | | | | |
| Notched Izod impact strength, ft. lbs./in. | | | | | | | | |
| ⅛ inch specimen | 14.8 | 12.4 | 14.3 | 10.0 | 9.5 | 10.0 | 10.9 | 10.3 |
| ¼ inch specimen | 1.6° | 8.8 | 10.6 | 6.9 | 6.9 | 6.9 | 5.1 | 9.0 |
| Double gate impact strength, ft. lb. | 40 | 2.0° | 8.9 | 5.4$^H$ | 5.1$^H$ | 5.0$^H$ | 1.8$^H$ | 4.5$^H$ |
| After Gasoline Soaking | | | | | | | | |
| Notched Izod impact strength, | | | | | | | | |

TABLE 1-continued

| | COMPOSITIONS AND PROPERTIES | | | | | | | |
|---|---|---|---|---|---|---|---|---|
| Example | PC* | 1A* | 1 | 2 | 3 | 4 | 5 | 6 |
| ft. lbs./in. | | | | | | | | |
| ⅛ inch specimen | fail | 10.5 | 14.3 | 1.1° | 1.1° | 3.5° | 10.2 | 10.3 |

*Control experiment
**Numerical superscripts indicate percent of test samples which were ductile. Superscript "H" indicates that the sample failed in a hinged mode, which is an improvement over brittle failure. No superscript means 100% ductile mode in failure.

The data indicate the following: The brittle impact failure proclivity of polycarbonate in thick sections alone (PC*) is confirmed, as is its failure to resist environmental stress crazing and cracking. When an olefin polymer or copolymer is included as component (b), the double gate impact strength is improved by adding component (c), the olefin/acrylate copolymer or olefin acrylic acid terpolymer. The blended compositions all have some degree of resistance to gasoline better than polycarbonate alone, Examples 1, 5 and 6 being particularly outstanding in this respect.

The above-mentioned patents and/or publications are incorporated herein by reference. Obviously, other modifications and variations are possible in the light of the above disclosure. For instance, other polycarbonate resins can be substituted for poly(bisphenol A carbonate). Besides polypropylene and ethylene-propylene copolymers, other olefin resins can be used, such as polyethylene. It is to be understood, therefore, that changes may be made in the particular embodiments shown which are still within the scope of the invention defined in the appended claims.

1. A thermoplastic composition, comprising an intimate blend of
   (a) from about 55 to about 93 parts by weight of an aromatic polycarbonate resin;
   (b) from about 3.5 to about 30 parts b weight of a polyolefin homopolymer an olefin copolymer or terpolymer made solely from olefin monomers or mixtures thereof; and
   (c) from about 3.5 to about 15 parts by weight of a third polymeric component comprising a copolymer of one or more olefins and a monomeric acrylate, methacrylate, acrylic acid or methacrylic acid, the amount of (c) being at least sufficient to impart to the blend a resistance to impact failure in thick sections greater than that possessed by (a), and a weld line impact strength better than that possessed by (a) and (b) in combination the total weight of (a), (b), and (c) combined is 100 parts.

2. A composition according to claim 1, in which the aromatic polycarbonate resin has the formula

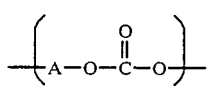

wherein A is a divalent aromatic radical of a dihydric phenol.

3. A composition according to claim 1, in which the aromatic polycarbonate resin has the formula $$\left\{ \begin{array}{c} (X)_p \\ \phantom{x} \\ \phantom{x} \end{array} \begin{array}{c} R^1 \\ | \\ C \\ | \\ R^2 \end{array} \begin{array}{c} (X)_r \\ \phantom{x} \\ \phantom{x} \end{array} -O-\overset{O}{\underset{\|}{C}}-O \right\}_n$$

wherein $R^1$ and $R^2$ are, independently, hydrogen, alkyl having from 1 to about 10 carbon atoms, or phenyl; X is, independently, alkyl having from 1 to about 10 carbon atoms, chloro, bromo or hydrogen; p and r are independently, from zero to 4; and n represents the total number of monomer units and is an integer of at least about 30.

4. A composition according to claim 1, in which the aromatic polycarbonate resin is poly(bisphenol A carbonate).

5. A composition according to claim 1, in which the olefin resin (b) is selected from the group consisting of polyethylene, polypropylene, polyisobutylene, a copolymer of ethylene and propylene, terpolymers of ethylene, propylene and a diene copolymer of ethylene and butene-1 and mixtures thereof.

6. A composition according to claim 1, in which component (b) comprises polypropylene.

7. A composition according to claim 6, in which component (b) comprises a terpolymer of ethylene, propylene and a diene.

8. A composition according to claim 1, in which component (b) comprises a copolymer of ethylene and propylene.

9. A composition according to claim 1, in which component (b) comprises a linear low density polyethylene.

10. A composition according to claim 1, in which component (c) comprises a copolymer of ethylene and ethyl acrylate.

11. A composition according to claim 1, in which component (c) comprises a terpolymer of ethylene, propylene and acrylic acid.

12. A composition according to claim 1, wherein a reinforcing amount of a filler is present.

13. A composition according to claim 12, wherein said filler comprises glass fiber.

14. A composition according to claim 1, wherein a flame retardant effective amount of a metal salt of an organic sulfonic acid is also present.

15. An article which has been molded from a composition according to claim 1, said article being characterized by improved resistance to environmental stress cracking and crazing in comparison with a corresponding article consisting of the aromatic polycarbonate resin alone.

16. A thermoplastic composition comprising an intimate blend of
   (a) from about 55 to about 93 parts by weight of an aromatic polycarbonate resin;

(b) from about 3.5 to about 30 parts by weight of a polymer made solely from olefin monomers selected from the group consisting of polyolefin homopolymer, an olefin copolymer or terpolymer made solely from olefin monomers and mixtures thereof; and
(c) from about 3.5 to 15 parts by weight of a third polymeric component comprising a copolymer of one or more aliphatic monoalphaolefins and a monomeric acrylate, methacrylate, acrylic acid or methacrylic acid, the amount of (c) being at least sufficient to impart to the blend a resistance to impact failure in thick sections greater than that possessed by (a), and a weld line impact strength better than that possessed by (a) and (b) in combination, the total weight of (a), (b), and (c) combined is 100 parts.

* * * * *